(12) United States Patent
Takano et al.

(10) Patent No.: US 7,545,987 B2
(45) Date of Patent: *Jun. 9, 2009

(54) IMAGE PROCESSING APPARATUS AND IMAGE PROCESSING METHOD

(75) Inventors: Gaku Takano, Yokohama (JP); Takahiro Fuchigami, Yokosuka (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 920 days.

This patent is subject to a terminal disclaimer.

(21) Appl. No.: 10/944,049

(22) Filed: Sep. 20, 2004

(65) Prior Publication Data

US 2005/0031217 A1 Feb. 10, 2005

Related U.S. Application Data

(63) Continuation of application No. 09/667,102, filed on Sep. 21, 2000, now Pat. No. 6,888,968.

(51) Int. Cl.
*G06K 9/36* (2006.01)

(52) U.S. Cl. .................. 382/232; 382/245; 382/246

(58) Field of Classification Search ......... 382/232–233, 382/235–236, 238, 245–246
See application file for complete search history.

(56) References Cited

U.S. PATENT DOCUMENTS

| | | | |
|---|---|---|---|
| 4,723,161 A | 2/1988 | Koga | |
| 4,955,061 A | 9/1990 | Doi et al. | |
| 5,363,139 A | 11/1994 | Keith | |
| 5,563,661 A | 10/1996 | Takahashi et al. | |
| 5,592,569 A | 1/1997 | Li | |
| 5,619,338 A | 4/1997 | Nakai et al. | |
| 5,859,604 A | 1/1999 | Slattery et al. | |
| 5,881,173 A | 3/1999 | Ohmori | |
| 5,883,975 A | 3/1999 | Narita et al. | |
| 6,011,305 A | 1/2000 | Suzuki et al. | |
| 6,025,586 A | 2/2000 | Sakaue et al. | |
| 6,028,981 A | 2/2000 | Hirasawa et al. | |
| 6,091,854 A | 7/2000 | Slattery et al. | |

(Continued)

FOREIGN PATENT DOCUMENTS

JP 5-252404 A 9/1993

(Continued)

*Primary Examiner*—Duy M Dang
(74) *Attorney, Agent, or Firm*—Foley & Lardner LLP (57) ABSTRACT

When a plurality of image data are to be compressed, an image correlation information extraction unit extracts respective image correlation information of image data, using first image data as reference image data. An encoding unit compresses the extracted image correlation information to produce encoded data. A data output unit outputs the compressed data and the reference image data to a page memory. When the compressed data are to be restored, a data input unit supplies the image correlation data input from the page memory to an image correlation information decoding unit, and supplies the reference image data to an image restoring unit. The image correlation information decoding unit decodes the image correlation data into the respective image correlation information and supplies the image correlation information to the image restoring unit. The image restoring unit restores the plural image data from the respective image correlation information and the reference image data.

6 Claims, 9 Drawing Sheets

U.S. PATENT DOCUMENTS

| | | |
|---|---|---|
| 6,188,728 B1 * | 2/2001 | Hurst .................... 375/240.16 |
| 6,404,932 B1 | 6/2002 | Hata et al. |
| 6,490,373 B2 | 12/2002 | Hata et al. |
| 6,512,793 B1 | 1/2003 | Maeda |
| 6,577,761 B1 | 6/2003 | Kanno et al. |
| 6,643,031 B1 | 11/2003 | Takano et al. |
| 6,657,746 B1 | 12/2003 | Fuchigami et al. |
| 6,888,968 B1 * | 5/2005 | Takano et al. ............... 382/245 |
| 2003/0026340 A1 | 2/2003 | Divakaran et al. |
| 2003/0067636 A1 | 4/2003 | Kanno et al. |

FOREIGN PATENT DOCUMENTS

| | | |
|---|---|---|
| JP | 6-19678 A | 1/1994 |
| JP | 6-204891 A | 7/1994 |
| JP | 8-32819 A | 2/1996 |
| JP | 9-55856 A | 2/1997 |
| JP | 9-116907 A | 5/1997 |
| JP | 10-233408 A | 9/1998 |

* cited by examiner

IMAGE PROCESSING APPARATUS AND IMAGE PROCESSING METHOD

The present application is a continuation of U.S. application Ser. No. 09/667,102, filed Sep. 21, 2000, the entire contents of which are incorporated herein by reference.

BACKGROUND OF THE INVENTION

The present invention relates to an image processing apparatus used in an image forming apparatus such as a digital copying machine, wherein an image on an original is read and input by image input means such as a scanner, the input image is subjected to a predetermined image process such as image-quality adjustment, edit processing, or compression/decompression, and the resultant image is output onto a paper sheet by image output means such as an electrophotographic printer.

Methods of compressing image data read by the scanner include an MH (modified Huffman) compression method and an MR (modified READ) compression method. In the MH compression, a length of continuous white pixels/black pixels, which is called a run length, is extracted from image data digitized in units of a scan line, and the extracted run length is encoded. The obtained code is a well-known variable-length code called a Huffman code. In the Huffman coding, a short code is assigned to more frequently occurring data, and a long code is to less frequently occurring data, whereby image data compression is effected. In the MR compression, correlation of adjacent scan lines is utilized on the basis of the MH compression, whereby coding efficiency is enhanced. There is known a processing method for effecting optimal data compression by selecting the MH compression or the MR compression.

There is also known a data compression method wherein even if the statistical properties of an information source are unknown, the data compression using the run length code can be performed by making use of the correlation of adjacent image data.

However, where a plurality of still image data of a plurality of originals input by the scanner are those of successive original images of the same format, as in the case of slips, data compression has to be effected in units of image data by the above-described method despite a great number of images of common parts being present. Since the images of common parts are compressed in units of image data, time is consumed uselessly and the amount of compressed data increases. Thus, the efficiency of compression is low.

BRIEF SUMMARY OF THE INVENTION

The object of the present invention is to provide an image processing apparatus and an image processing method capable of efficiently compressing a plurality of still image data of successive original images of the same format.

In order to achieve the above object, the present invention provides an image processing apparatus comprising: extraction means for setting, when a plurality of still image data of successive original images of the same format have been input, one of the plural still image data as reference image data, and extracting respective image correlation information of the plural still image data including the reference image data; encoding means for encoding the image correlation information extracted by the extraction means into encoded data; and output means for outputting the encoded data encoded by the encoding means and the reference image data.

The invention also provides an image processing apparatus comprising: input means for inputting encoded data formed by encoding respective image correlation information between reference image data and a plurality of still image data; decoding means for decoding the respective image correlation information from the encoded data input by the input means; and image restoring means for restoring the plural still image data from the image correlation information decoded by the decoding means and the reference image data input by the input means.

The invention also provides an image processing apparatus comprising: extraction means for setting, when a plurality of still image data of successive original images of the same format have been input, one of the plural still image data as reference image data, and extracting respective image correlation information of the plural still image data including the reference image data; first encoding means for encoding the respective image correlation information extracted by the extraction means into first encoded data; second encoding means for encoding the reference image data into second encoded data and output means for outputting the second encoded data encoded by the second encoding means and the first encoded data encoded by the first encoding means.

The invention also provides an image processing apparatus comprising: input means for inputting first encoded data formed by encoding reference image data, and second encoded data formed by encoding respective image correlation information among a plurality of still image data; first decoding means for decoding the reference image data from the first encoded data input by the input means: second decoding means for decoding the respective image correlation information from the second encoded data input by the input means; and image restoring means for restoring the plural still image data from the respective image correlation information decoded by the second decoding means and the reference image data decoded by the first decoding means.

The invention also provides an image processing apparatus comprising: image correlation enhancing means for enhancing, when a plurality of digital still image data of successive original images of the same format have been input, an image correlation degree by rearranging the image data such that a Hamming distance among the images decreases; extraction means for extracting respective image correlation information from the plural digital still image data rearranged by the image correlation enhancing means, by calculating an exclusive OR of pixel values of pixel positions associated with preceding image and subsequent image data in the order of the image data; encoding means for compressing the respective image correlation information extracted by the extraction means to encoded data by run-length encoding; and output means for outputting the encoded data encoded by the run-length encoding by the encoding means, and first image data of the image data rearranged by the image correlation enhancing means.

The invention also provides an image processing apparatus comprising: code conversion means for converting a plurality of input multi-value still image data of successive original images of the same format to gray codes; extraction means for setting one of the plural multi-value still image data converted by the code conversion means to the gray codes as reference image data, and extracting respective image correlation information of the plural multi-value still image data including the reference image data by an exclusive OR operation of the same bit; first encoding means for checking a run of zero values in the respective image correlation information extracted by the extraction means, and converting the image correlation information to entropy codes, thus producing first encoded data; second encoding means for encoding the reference image data to second encoded data; and output means for outputting the second encoded data encoded by the second encoding means and the first encoded data encoded by the first encoding means.

The invention also provides an image processing apparatus comprising: input means for inputting second encoded data formed by encoding reference image data, and first encoded data formed by encoding respective image correlation information among a plurality of multi-value still image data; first decoding means for decoding the reference image data from the second encoded data input by the input means: second decoding means for decoding the respective image correlation information from the first encoded data input by the input means, on the basis of an entropy code decoding method; image restoring means for restoring the plural multi-value still image data by a logical operation from the respective image correlation information decoded by the second decoding means and the reference image data decoded by the first decoding means; and code conversion means for converting the plural multi-value image data restored by the image restoring means from gray codes to original codes.

The invention also provides an image processing method comprising the steps of: setting, when a plurality of still image data of successive original images of the same format have been input, one of the plural still image data as reference image data, and extracting respective image correlation information of the plural still image data including the reference image data; encoding the extracted image correlation information into encoded data; and output means for outputting the encoded data and the reference image data.

The invention also provides an image processing method comprising the steps of: inputting encoded data formed by encoding respective image correlation information between reference image data and a plurality of still image data; decoding the respective image correlation information from the input encoded data; and restoring the plural still image data from the decoded image correlation information and the reference image data.

DETAILED DESCRIPTION OF THE INVENTION

Embodiments of the present invention will now be described with reference to the accompanying drawings.

Figure 1:
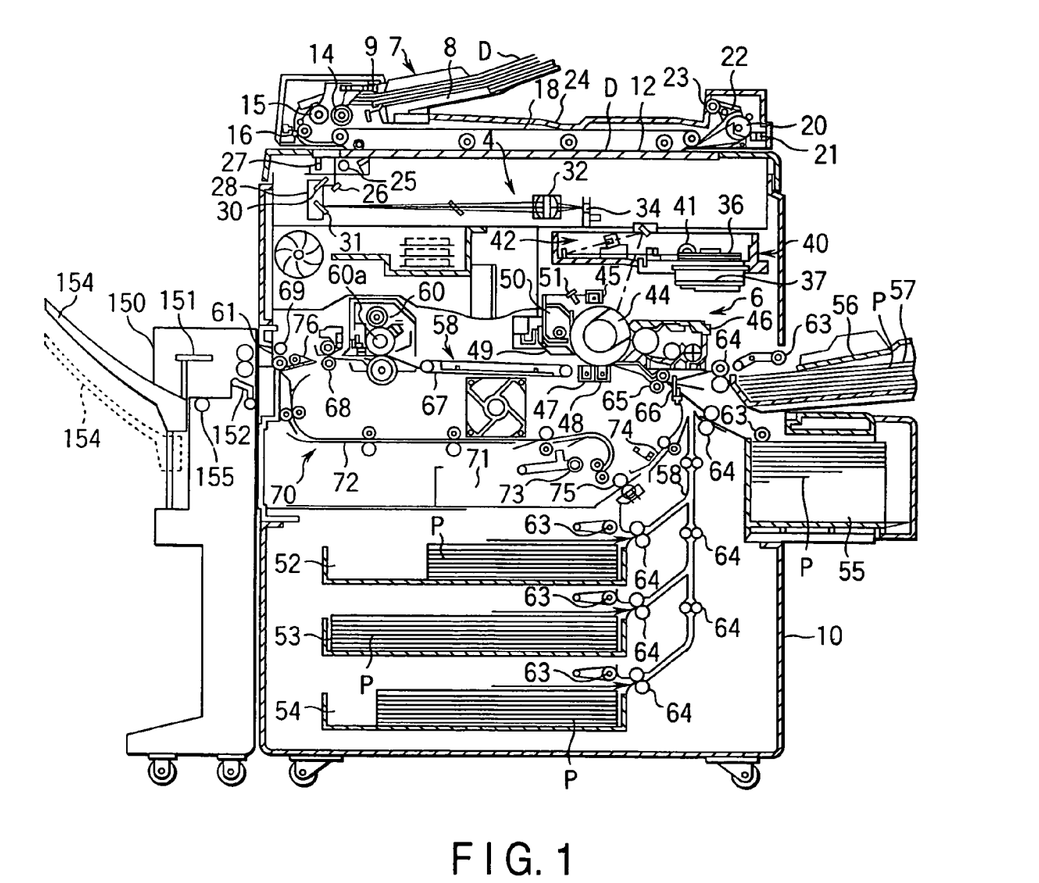
FIG. 1 is a side view schematically showing an internal structure of an image forming apparatus, such as a digital copying machine, according to an embodiment of the present invention.

FIG. 1 shows an internal structure of a digital copying machine having an image processing apparatus according to the present invention. This digital copying machine is, for example, a composite-type copying machine having three functions of a copying machine, a facsimile, and a printer.

In FIG. 1, reference numeral 10 denotes an apparatus main body. The apparatus main body 10 incorporates a scanner section 4 functioning as an image input means and a printer section 6 functioning as an image output means.

An original table 12 formed of transparent glass, on which a read object, i.e. an original D is placed, is disposed on the upper surface of the apparatus main body 10. An automatic document feeder 7 (hereinafter referred to as "ADF") for automatically feeding originals D onto the original table 12 is disposed on the upper surface of the apparatus main body 10. The ADF 7 is disposed to be opened/closed with respect to the original table 12 and serves as an original cover for bringing the original D placed on the original table 12 into close contact with the original table 12.

The ADF 7 has an original tray 8 on which the original D is set; an empty sensor 9 for detecting the presence/absence of originals; pickup rollers 14 for picking up originals on the original tray 8 one by one; a feed roller 15 for conveying the picked-up original; an aligning roller pair 16 for aligning the leading edges of the originals; and a conveyor belt 18 disposed to cover almost the entire surface of the original table 12. A plurality of originals set on the original tray 8 with their surfaces facing up are sequentially taken out from the lowermost page, i.e. the last page, aligned by the aligning roller pair 16, and conveyed to a predetermined position on the original table 12 by the conveyor belt 18.

In the ADF 7, a reversing roller 20, a non-reverse sensor 21, a flapper 22 and a delivery roller 23 are disposed at the end portion on the opposite side of the aligning roller pair 16 with respect to the conveyor belt 18. The original D whose image information has been read by the scanner section 4 is fed from the original table 12 by the conveyor belt 18 and delivered to an original delivery section 24 on the ADF 7 through the reversing roller 20, flapper 21 and delivery roller 22. To read the lower surface of the original D, the flapper 22 is switched. The original D conveyed by the conveyor belt 18 is reversed by the reversing roller 20 and fed to a predetermined position on the original table 12 again by the conveyor belt 18.

The scanner section 4 provided in the apparatus main body 10 has an exposure lamp 25 as a light source for illuminating the original D placed on the original table 12, and a first mirror 26 for deflecting reflection light from the original D in a predetermined direction. The exposure lamp 25 and first mirror 26 are attached to a first carriage 27 disposed under the original table 12. The first carriage 27 is disposed to be movable in parallel to the original table 12 and reciprocally moved under the original table 12 by a driving motor through a toothed belt (not show), etc.

A second carriage 28 movable in parallel to the original table 12 is disposed under the original table 12. Second and third mirrors 30 and 31 for successively deflecting reflection light from the original D, which has been deflected by the first mirror 26, are attached to the second carriage 28 at right angles with each other. The second carriage 28 is moved by, e.g. the toothed belt for driving the first carriage 27 along with the first carriage 27, and moved in parallel along the original table 12 at half the speed of the first carriage.

A focusing lens 32 for focusing reflection light from the third mirror 31 mounted on the second carriage 28, and a CCD line sensor 34 serving as photoelectric conversion means for receiving the reflected light focused by the focusing lens 32 and photoelectrically converting it are also disposed under the original table 12. The focusing lens 32 is disposed in a plane including the optical axis of the light deflected by the third mirror 31 so as to be movable by means of a driving mechanism. The focusing lens 32 moves to focus the reflection light at a desired magnification. The line sensor 34 photoelectrically converts the incoming reflection light and outputs an electrical signal corresponding to the read original D.

On the other hand, the printer section 6 has a laser exposure unit 40 functioning as a latent image forming means. The laser exposure unit 40 comprises a semiconductor laser 41 as a light source; a polygon mirror 36 as a scanning member for continuously deflecting a laser beam emitted by the semiconductor laser 41; a polygon motor 37 as a scanning motor for rotatably driving the polygon mirror 36 at a predetermined rotational speed (to be described later); and an optical system 42 for deflecting the laser beam from the polygon mirror 36 and guiding the beam to a photosensitive drum 44 (to be described later). The laser exposure unit 40 with the above structure is fixed to a support frame (not shown) of the apparatus main body 10.

The semiconductor laser 41 is ON/OFF-controlled in accordance with the image information of the original D read by the scanner section 4 or facsimile transmission/reception document information. The laser beam is directed to the photosensitive drum 44 through the polygon mirror 36 and optical system 42 to scan the outer surface of the photosensitive drum 44, thereby forming an electrostatic latent image on the outer peripheral surface of the photosensitive drum 44.

The printer section 6 has the rotatable photosensitive drum 44 as an image carrier disposed almost at the center of the apparatus main body 10. The outer peripheral surface of the photosensitive drum 44 is exposed to the laser beam from the laser exposure unit 40, and so a desired electrostatic latent image is formed thereon. Around the photosensitive drum 44, the following elements are arranged in the named order: a charger 45 for electrifying the outer peripheral surface of the drum 44 with a predetermined charge; a developing device 46 serving as developing means for supplying toner as a developer to the electrostatic latent image formed on the outer peripheral surface of the photosensitive drum 44 to develop it at a desired image density; a separation charger 47 for separating an image formation medium, i.e. a paper sheet P, fed from a paper cassette (to be described later) from the photosensitive drum 44; a transfer charger 48 for transferring the toner image formed on the photosensitive drum 44 onto the paper sheet P; a separation gripper 49 for separating the paper sheet P from the outer peripheral surface of the photosensitive drum 44; a cleaning unit 50 for removing toner remaining on the outer peripheral surface of the photosensitive drum 44; and a discharger 51 for de-electrifying the outer peripheral surface of the photosensitive drum 44.

An upper sheet cassette 52, a middle sheet cassette 53 and a lower sheet cassette 54 which can be drawn out of the apparatus main body 10 are stacked at the lower portion of the apparatus main body 10. These cassettes 52 to 54 store paper sheets P of different sizes. A large-capacity feeder 55 is disposed on one side of these cassettes. This large-capacity feeder 55 stores about 3,000 paper sheets P having a size with high use frequency, e.g. paper sheets P with A4 size. A feed cassette 57 also serving as a manual feed tray 56 is detachably attached above the large-capacity feeder 55.

A convey path 58 extending from the sheet cassettes 52 to 54 and large-capacity feeder 55 through a transfer section located between the photosensitive drum 44 and transfer charger 48 is formed in the apparatus main body 10. A fixing unit 60 having a fixing lamp 60a is disposed at the end of the convey path 58. A delivery port 61 is formed in the side wall of the apparatus main body 10, which is opposed to the fixing unit 60. A single-tray finisher 150 is attached to the delivery port 61.

Pickup rollers 63 for taking out the paper sheets P one by one from the sheet cassette, 52, 53, 54, 57 or large-capacity feeder 55 are arranged near each of the upper sheet cassette 52, middle sheet cassette 53, lower sheet cassette 54 and feed cassette 57 and near the large-capacity feeder 55. A number of feed roller pairs 64 for conveying the paper sheet P taken out by the pickup rollers 63 through the convey path 58 are arranged in the convey path 58.

A registration roller pair 65 is arranged in the convey path 58 on the upstream side of the photosensitive drum 44. The registration roller pair 65 corrects a tilt of the extracted paper sheet P, registers the leading edge of the toner image on the photosensitive drum 44 and the leading edge of the paper sheet P, and feeds the paper sheet P to the transfer section at the same speed as the speed of movement of the outer peripheral surface of the photosensitive drum 44. A prealigning sensor 66 for detecting arrival of the paper sheet P is provided in front of the registration roller pair 65, i.e. on the feed roller 64 side.

Each paper sheet P extracted one by one from the sheet cassette, 52, 53, 54, 57 or large-capacity feeder 55 by the pickup rollers 63 is fed to the registration roller pair 65 by the feed roller pair 64. After the leading edge of the paper sheet P is aligned by the registration roller pair 65, the paper sheet P is fed to the transfer section.

In the transfer section, a developer image, i.e. toner image formed on the photosensitive drum 44 is transferred onto the paper sheet P by the transfer charger 48. The paper sheet P on which the toner image has been transferred is separated from the outer peripheral surface of the photosensitive drum 44 by the function of the separation charger 47 and separation gripper 49 and conveyed to the fixing unit 60 through a conveyor belt 67 constituting part of the convey path 52. After the developer image is melted and fixed on the paper sheet P by the fixing unit 60, the paper sheet P is delivered onto the finisher 150 through the delivery port 61 by a feed roller pair 68 and a delivery roller pair 69.

An automatic double-side unit 70 for reversing the paper sheet P which has passed through the fixing unit 60 and feeding it to the registration roller pair 65 again is provided under the convey path 58. The automatic double-side unit 70 comprises a temporary stack 71 for temporarily stacking the paper sheets P; a reversing path 72 branched from the convey path 58 to reverse the paper sheet P which has passed through the fixing unit 60 and to guide the paper sheet P to the temporary stack 71; pickup rollers 73 for extracting the paper sheets P stacked on the temporary stack 71 one by one; and a feed roller 75 for feeding the extracted paper sheet P to the registration roller pair 65 through a convey path 74. A selector gate 76 for selectively distributing the paper sheets P to the delivery port 61 or reversing path 72 is provided at the branch portion between the convey path 58 and reversing path 72.

Where double-copying is performed, the paper sheet P which has passed through the fixing unit 60 is guided to the reversing path 72 by the selector gate 76, temporarily stacked on the temporary stack 71 in a reversed state, and fed to the registration roller pair 65 through the convey path 74 by the pickup rollers 73 and feed roller 75. The paper sheet P is registered by the registration roller pair 65 and fed to the transfer section again to transfer a toner image onto the reverse surface of the paper sheet P. Thereafter, the paper sheet P is delivered to the finisher 150 through the convey path 58, fixing unit 60 and delivery rollers 69.

The finisher 150 staples delivered copies of documents and stores them in units of a copy. Each time a paper sheet P to be stapled has been delivered from the delivery port 61, a guide bar 151 aligns the paper sheet P to the stapling side. When all paper sheets have been delivered, a copy of paper sheets P is pressed by a paper press arm 152 and stapled by a stapler unit (not shown).

Then the guide bar 151 moves downward. The stapled paper sheets P are delivered to a finisher delivery tray 154 by a finisher delivery roller 155 in units of a copy. The downward movement amount of the finisher delivery tray 154 is roughly determined in accordance with the number of paper sheets P to be delivered, and the finisher delivery tray 154 moves downward stepwise every time one copy is delivered. The guide bar 151 for aligning the delivered paper sheets P is located at such a high position that the guide bar 151 may not abut upon the already stapled paper sheets P placed on the finisher delivery tray 154.

The finisher delivery tray 154 is connected to a shift mechanism (not shown) which shifts (e.g. in four directions: front, rear, left and right sides) in units of a copy in the sort mode.

An operation panel 80 (not shown) for inputting various copy conditions and a copy start command for starting copying operation and displaying the operation state, etc. is provided at the upper portion on the front side of the apparatus main body 10.

Figure 2:
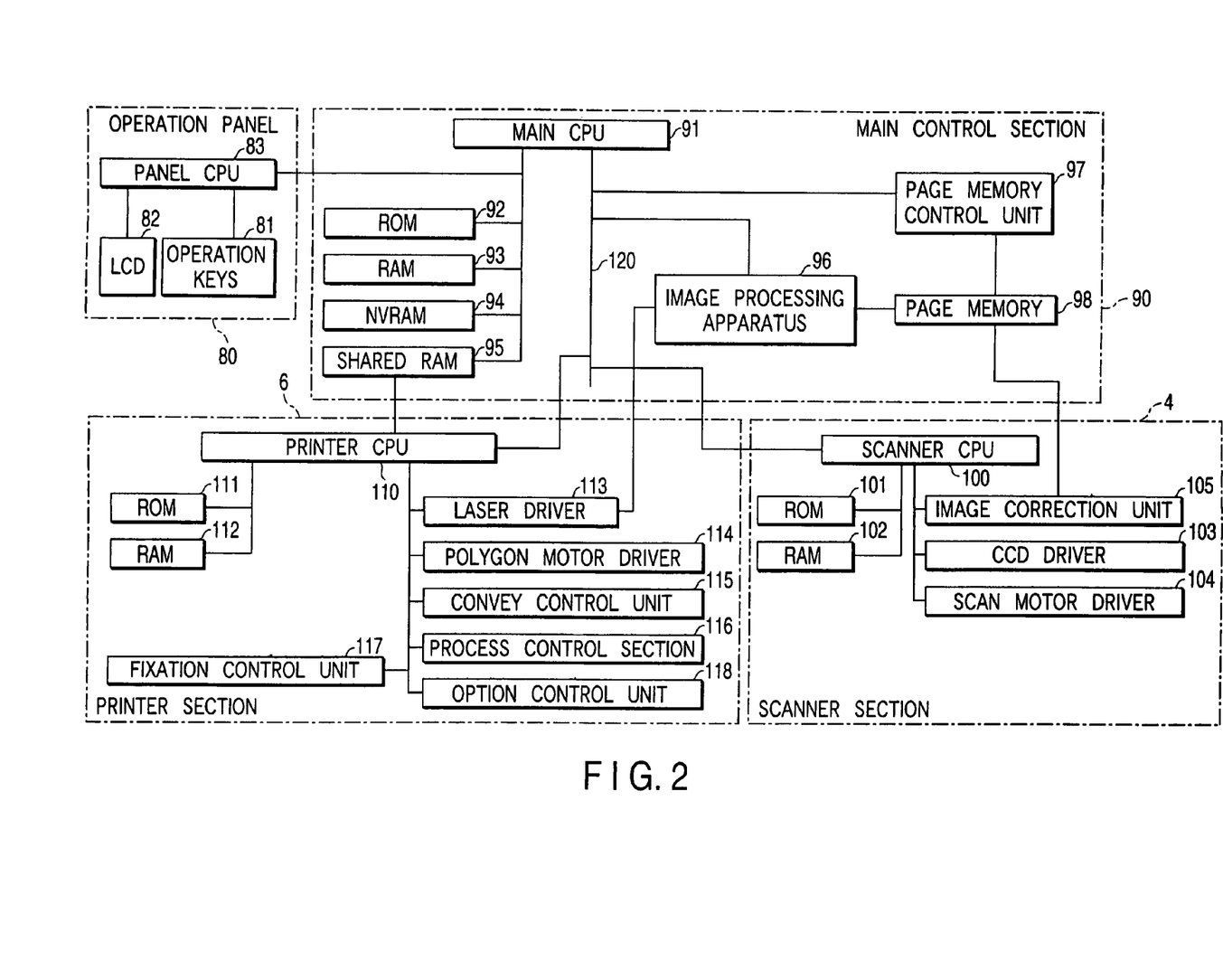
FIG. 2 is a block diagram schematically showing electrical connection of the image forming apparatus shown in FIG. 1 and flow of signals for control.

FIG. 2 is a block diagram schematically showing electrical connection of the digital copying machine shown in FIG. 1 and flow of signals for control. In FIG. 2, a control system comprises three CPUs (Central Control Units): a main CPU 91 provided in a main control section 90; a scanner CPU 100 in the scanner section 4; and a printer CPU 110 in the printer section 6. These CPUs are connected by a shared bus 120.

The main CPU 91 performs bi-directional communication with the printer CPU 110 via a shared RAM 95. The main CPU 91 issues an operational instruction, and the printer CPU 110 returns status data. Serial communication is performed between the printer CPU 110 and scanner CPU 100. The printer CPU 110 issues an operational instruction, and the scanner CPU 100 returns status data.

The shared bus 120 is a complete sync bus, like a PCI bus. In the shared bus 120, a single signal line is shared by an address bus and a data bus in a time-division manner. A peripheral device for program I/O transfer via the CPUs serves as a bus master for controlling the shared bus. Data transfer by the bus master, in which a memory, etc. are directly accessed, is possible.

An operation panel 80 comprises various operation keys 81, a liquid crystal display 82, and a panel CPU 83 to which the LCD 82 and operation keys 81 are connected.

The main control section 90 comprises the main CPU 91, a ROM 92, a RAM 93, an NVRAM 94, shared RAM 95, an image processing apparatus 96, a page memory control unit 97, and a page memory 98.

The main CPU 91 controls the entirety of the main control section 90. The ROM 92 stores control programs, etc. for the main CPU 91. The RAM 93 temporarily stores various data.

The NVRAM (Non-Volatile RAM) 94 is a non-volatile memory backed up by a battery (not shown). Even when power is not supplied to the NVRAM 34, stored data is maintained.

The shared RAM 95 is used to perform bi-directional communication between the main CPU 91 and printer CPU 110.

The page memory control unit 97 stores and reads out image information in and from the page memory 98. The page memory 98 has areas capable of storing image information of a plurality of pages. The page memory 98 can store compressed data in units of a page, which is obtained by compressing image information from the scanner section 4.

The scanner section 4 comprises the scanner CPU 100 for controlling the entirety of the scanner section 4; a ROM 101 storing control programs, etc.; a data storage RAM 102; a CCD driver 103 for driving the line sensor 34; a scan motor driver 104 for controlling the rotation of a scan motor for moving the exposure lamp 25, mirrors 26, 27 and 28, etc.; and an image correction unit 105.

The image correction section 105 comprises an A/D converter for converting analog signals output from the line sensor 34 to digital signals; a shading correction circuit for correcting a variance in the line sensor 34, or a variation in threshold level due to ambient temperature variation relative to the output signal from the line sensor 34; and a line memory for temporarily storing shading-corrected digital signals from the shading correction circuit.

The printer section 6 comprises the printer CPU 110 for controlling the entirety of the printer section 6; a ROM 111 storing control programs, etc.; a data storage RAM 112; a laser driver 113 for driving the semiconductor laser 41; a polygon motor driver 114 for driving the polygon motor 37 of the laser exposure unit 40; a convey control unit 115 for controlling conveyance of the sheet P by the convey mechanism 58; a process control section 116 for controlling charging, developing and transferring processes using the charging device 45, developing device 46 and transfer charger 48; a fixation control unit 117 for controlling the fixing device 60; and an option control unit 118 for control options.

The image correction section 105, page memory 98, image process section 96 and laser driver 113 are serially connected, and image data flows through these elements in the named order. It is possible, however, to let image data flow from the image correction section 105 to the image process section 96, without storing it in the page memory 98.

The present invention aims at efficiently compressing a plurality of still image data (plural still image data) of successive original images of the same format, as in the case of slips.

A description will now be given of the structure of the image processing apparatus 96 of this invention which efficiently compresses plural still image data by making use of correlation of image data.

Figure 3:
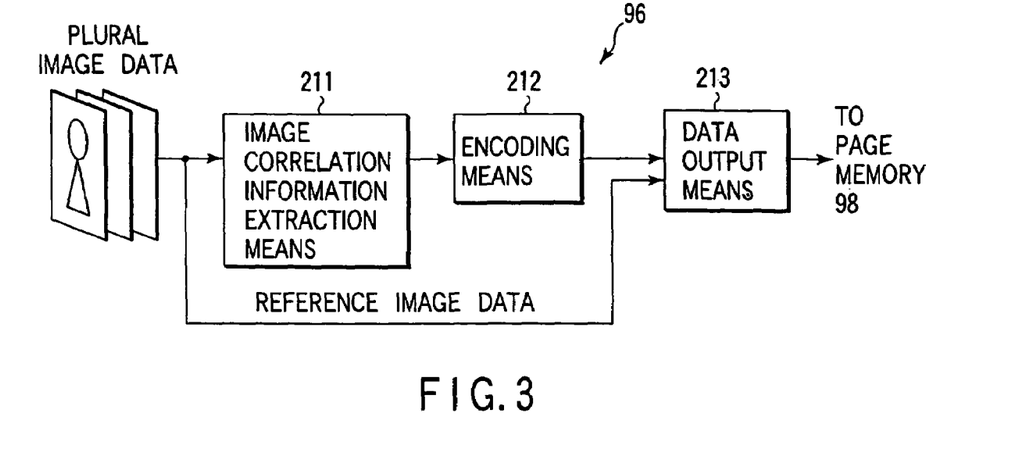
FIG. 3 schematically shows the structure of an image processing apparatus according to a first embodiment of the invention.

FIG. 3 schematically shows the structure of the image processing apparatus 96 according to a first embodiment of the present invention. In FIG. 3, image correlation information extraction means 211 of the image processing apparatus 96 extracts correlation information among image data including reference image data (e.g. first image data) from input plural image data. The reference image data is also delivered to data output means. The image correlation information extracted by the image correlation information extraction means 211 is sent to encoding means 212. The encoding means 212 compresses the input image correlation information to produce image correlation information encoded data. The image correlation information encoded data compressed by the encoding means 212 is delivered to the data output means 213. The data output means 213 outputs the input image correlation information encoded data and the reference image data.

The extraction of the image correlation information in the image correlation information extraction means 211 will now be described. The image correlation information extraction means 211 according to the first embodiment extracts image correlation information among images (in the case of bit map images) using Exclusive OR.

Assume that plural image data are P0 (i,j), . . . , Pn(i,j). Image correlation information among them is given by $$d\_0, 1(i, j) = P0(i, j) \text{ EOR } P1(i, j)$$
$$d\_1, 2(i, j) = P1(i, j) \text{ EOR } P2(i, j)$$
$$d\_2, 3(i, j) = P2(i, j) \text{ EOR } P3(i, j)$$
$$\vdots$$
$$\vdots$$
$$\vdots$$
$$d\_n-1, n(i, j) = Pn-1(i, j) \text{ EOR } Pn(i, j).$$

Specifically, the image correlation information extraction means 211 extracts image correlation information from plural image data input in order, by calculating an Exclusive OR of a pixel value at a pixel position corresponding to preceding image data and subsequent image data in accordance with the order of image data. For example, where preceding image data is P0 (i,j) and subsequent image data is P1 (i,j) in the order of image data, image correlation information is d_0,1 (i,j).

A description will now be given of the image correlation information encoded data obtained by compressing the image correlation information in the encoding means 212. The encoding means 212 converts the first image data (reference image data) and each of image correlation information units (n−1) to a run-length code. If the degree of correlation among images is high (i.e. similar images), "0" is successively produced. Thus, the image correlation information is compressed with high efficiency.

Figure 4:
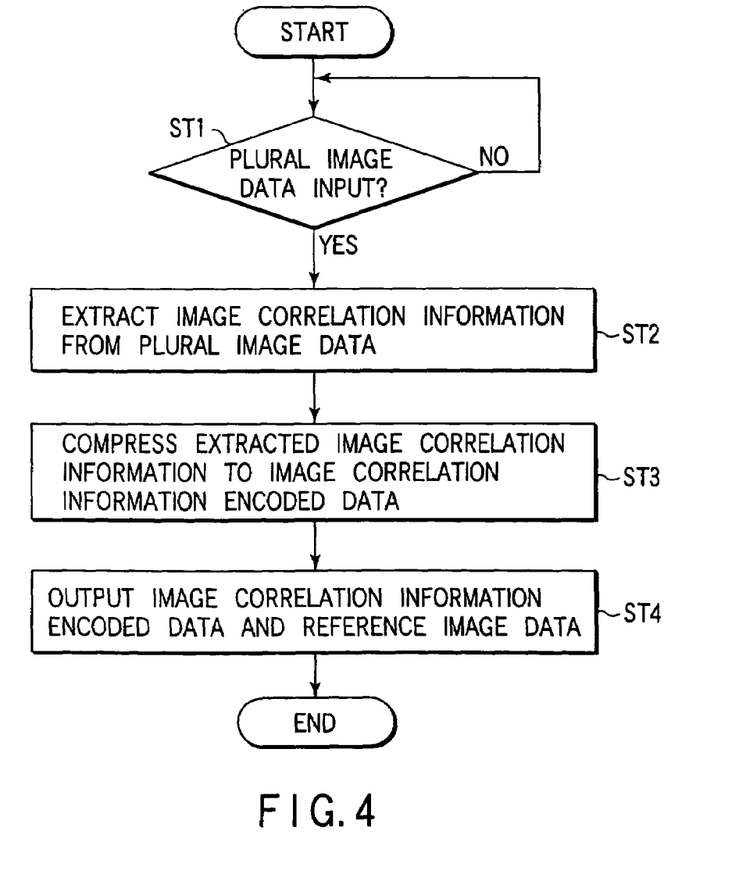
FIG. 4 is a flow chart illustrating an operation of efficiently compressing a plurality of still image data.

The operation of efficiently compressing plural still image data in the image processing apparatus 96 of the first embodiment by making use of the correlation of image data will now be described with reference to a flow chart of FIG. 4.

To start with, plural image data read by the scanner section 4 have been input (ST1). Assume that the plural image data are the data of successive original images of the same format, like slips. 4

In the image processing apparatus 96, the image correlation information extraction means 211 extracts image correlation information from the input plural image data including the first image data as reference image data (ST2). The image correlation information is sent to the encoding means 212. On the other hand, the first image data of the input plural image data is sent to the data output means 213 as the reference image data. The image correlation information is compressed in the encoding means 212 and converted to image correlation information encoded data (ST3). The image correlation information encoded data is sent to the data output means 213. The data output means 213 outputs the input image correlation information encoded data and reference image data (first image data) to the page memory 98 (ST4).

Figure 5:
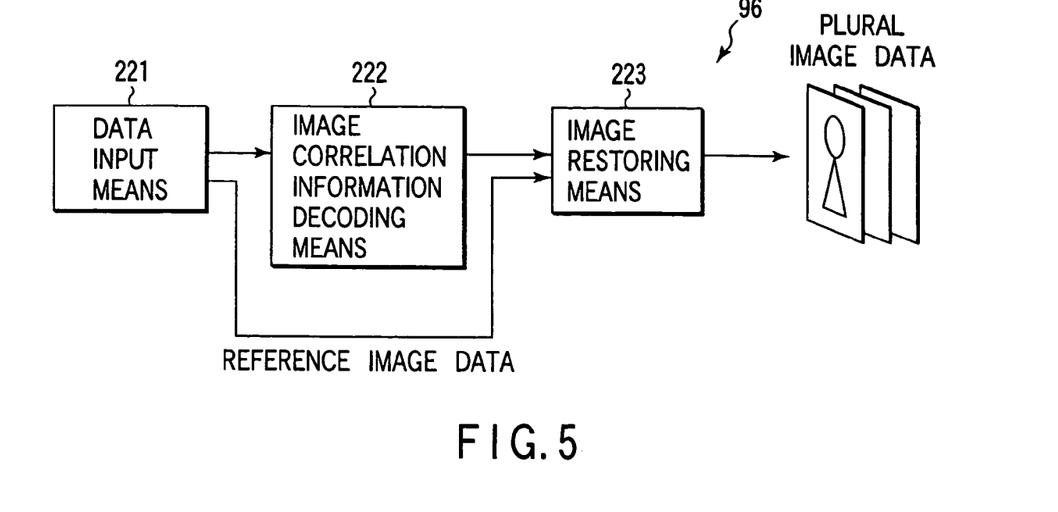
FIG. 5 schematically shows the structure of an image processing apparatus according to a second embodiment of the invention.

FIG. 5 schematically shows the structure of the image processing apparatus 96 according to a second embodiment of the invention. In the second embodiment, the image data compressed in the first embodiment is restored.

In FIG. 5, data input means 221 sends the input image correlation information encoded data to image correlation information decoding means 222 and also sends the input reference image data to image restoring means 223. The image correlation information decoding means 222 decodes the image correlation information from the input image correlation information encoded data. The image correlation information decoded by the image correlation information decoding means 222 is sent to the image restoring means 223. The image restoring means 223 restores the plural image data from the input reference image data and image correlation information.

In the first embodiment, the compression is described. In the second embodiment, encoded data of P0 is expanded to obtain P0 (i,j).

Using the obtained P0 (i,j), d_0,1 is expanded and P1 is obtained from $$P1(i,j) = \text{NOT } (d\_0,1(i,j)) \text{ AND } P0(i,j).$$

Similarly, P2 to Pn are obtained by $$P2(i, j) = \text{NOT } (d\_1, 2(i, j)) \text{ AND } P1(i, j)$$
$$\vdots$$
$$\vdots$$
$$\vdots$$
$$Pn(i, j) = \text{NOT } (d\_n-1, n(i, j)) \text{ AND } Pn-1(i, j).$$

As is understood from the above, only when d_l−1,l (i,j) is 1, may the image of Pl−1 be rewritten. Where plural image data are successively loaded on the page memory 98, signals necessary for rewriting are greatly reduced.

As has been described above, the image restoring means 223 restores next image data by a logical operation of image correlation information relating to reference image data and next image data and the reference image data, restores image data after next by a logical operation of image correlation information relating to the restored next image data and the image data after next and the next image data, and also restores subsequent image data by a logical operation of image correlation information relating to preceding image data and the subsequent image data in the order of image data and the restored preceding image data. Thus, plural still image data are restored.

Figure 6:
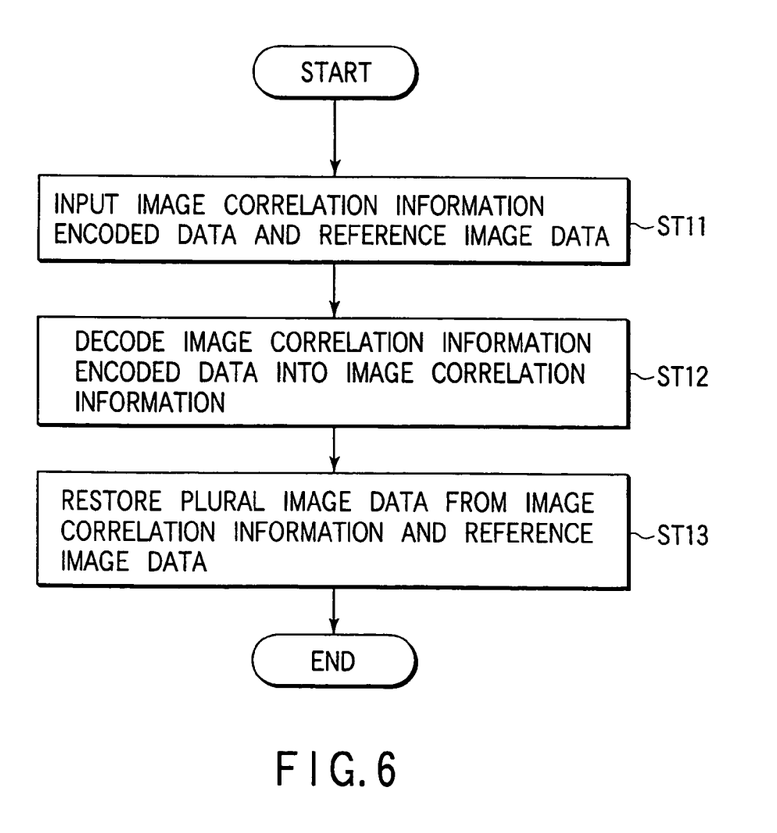
FIG. 6 is a flow chart illustrating an operation of restoring plural image data.

The operation of restoring plural image data in the image processing apparatus 96 of the second embodiment will now be described with reference to a flow chart of FIG. 6.

In the image processing apparatus 96, the image correlation information encoded data and reference image data are delivered from the page memory 98 to the data input means 221 (ST11). The data input means 221 sends the input image correlation information encoded data to the image correlation information decoding means 222 and also sends the input reference image data to the image restoring means 223. The input image correlation information encoded data sent to the image correlation information decoding means 222 is decoded into the image correlation information (ST12). The decoded image correlation information is sent to the image restoring means 223. The image restoring means 223 restores the plural image data from the input image correlation information and reference image data (ST13)

Figure 7:
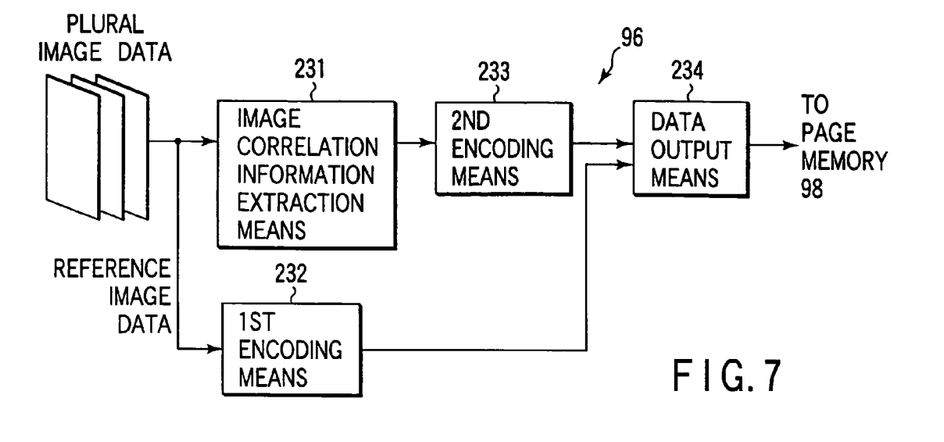
FIG. 7 schematically shows the structure of an image processing apparatus according to a third embodiment of the invention.

FIG. 7 schematically shows the structure of the image processing apparatus 96 according to a third embodiment of the present invention. In FIG. 7, image correlation information extraction means 231 of the image processing apparatus 96 extracts correlation information among image data including reference image data (e.g. first image data) from input plural image data. The image correlation information extracted by the image correlation information extraction means 231 is sent to second encoding means 233. First encoding means 232 compresses the reference image data of the input plural image data and converts it to reference image data encoded data. The reference image data encoded data compressed by the first encoding means 232 is sent to data output means 234. The second encoding means 233 compresses the input image correlation information to produce image correlation information encoded data. The image correlation information encoded data compressed by the second encoding means 233 is delivered to the data output means 234. The data output means 234 outputs the input reference image data encoded data and the image correlation information encoded data to the page memory 98.

The third embodiment is the same as the first embodiment except for the structure for encoding the reference image data in the first encoding means 232.

Figure 8:
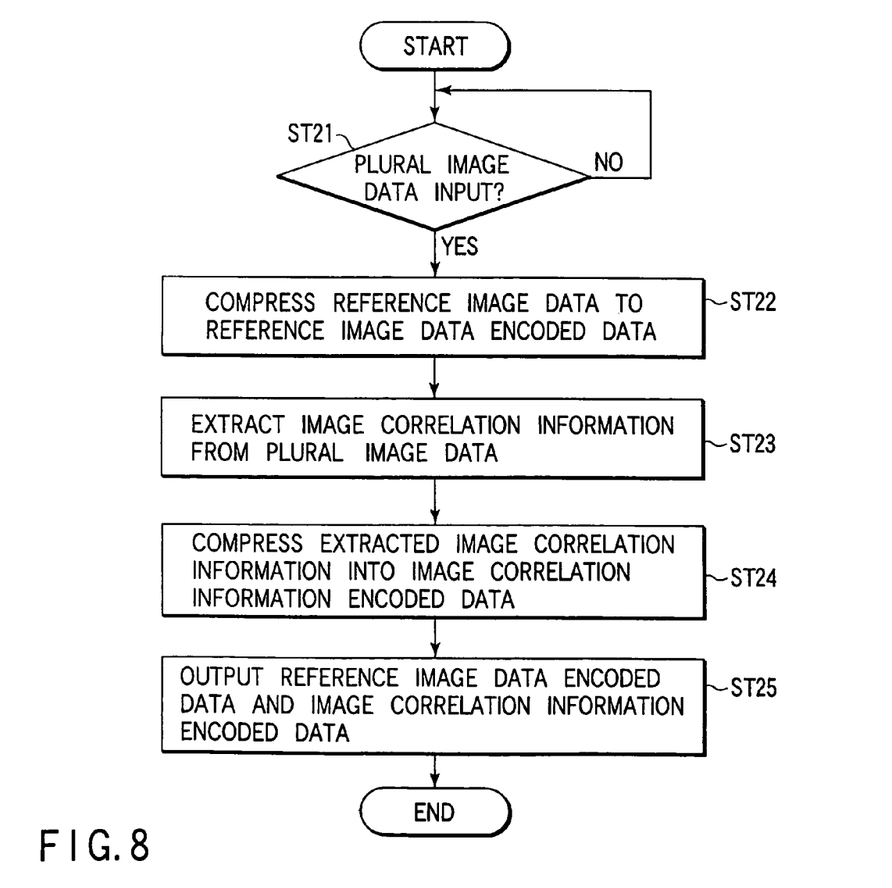
FIG. 8 is a flow chart illustrating an operation of efficiently compressing a plurality of still image data.

The operation of efficiently compressing plural still image data in the image processing apparatus 96 of the third embodiment by making use of the correlation of image data will now be described with reference to a flow chart of FIG. 8.

To start with, plural image data read by the scanner section 4 have been input (ST21). Assume that the plural image data are the data of successive original images of the same format, like slips.

In the image processing apparatus 96, first data of the input plural image data is used as reference image data. The first encoding means 232 compresses the reference image data to produce reference image data encoded data (ST22) and delivers it to the data output means 234. The image correlation information extraction means 231 extracts image correlation information from the input plural image data including the first image data as reference image data (ST23). The image correlation information is sent to the second encoding means 233. The image correlation information is compressed in the encoding means 233 and converted to image correlation information encoded data (ST24). The image correlation information encoded data is sent to the data output means 234. The data output means 234 outputs the input image correlation information encoded data and reference image data encoded data to the page memory 98 (ST25).

As has been described above, in the third embodiment, the reference image data, too, is encoded. Thereby, the data compression can be effected with still higher efficiency than in the first embodiment.

Figure 9:
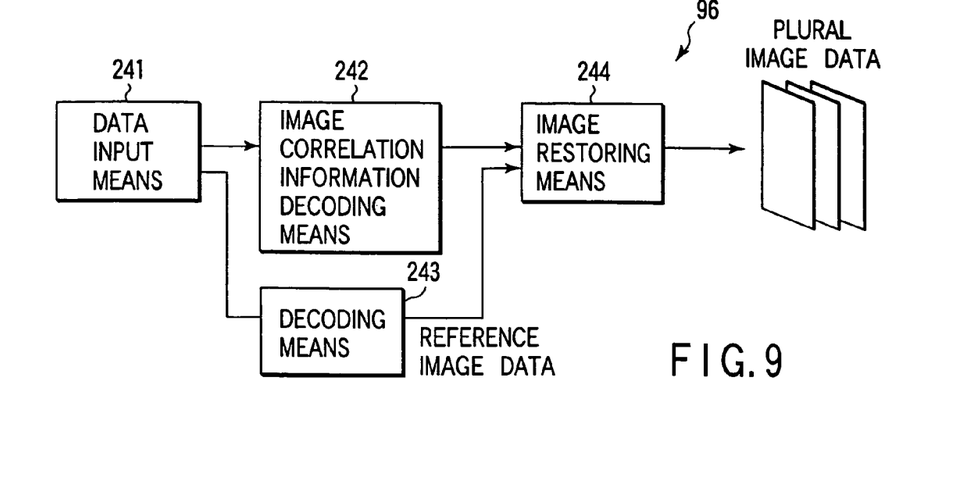
FIG. 9 schematically shows the structure of an image processing apparatus according to a fourth embodiment of the invention.

FIG. 9 schematically shows the structure of the image processing apparatus 96 according to a fourth embodiment of the invention. In the fourth embodiment, the image data compressed in the third embodiment is restored.

In FIG. 9, data input means 241 sends the input image correlation information encoded data to image correlation information decoding means 242 and also sends the input reference image data encoded data to decoding means 243. The image correlation information decoding means 242 decodes the image correlation information from the input image correlation information encoded data. The image correlation information decoded by the image correlation information decoding means 242 is sent to image restoring means 244. The decoding means 243 decodes the reference image data from the input reference image data encoded data. The reference image data decoded by the decoding means 243 is sent to the image restoring means 244. The image restoring means 244 restores the plural image data from the input reference image data and image correlation information.

The fourth embodiment is the same as the second embodiment except for the structure for decoding the reference image data encoded data in the decoding means 243.

Figure 10:
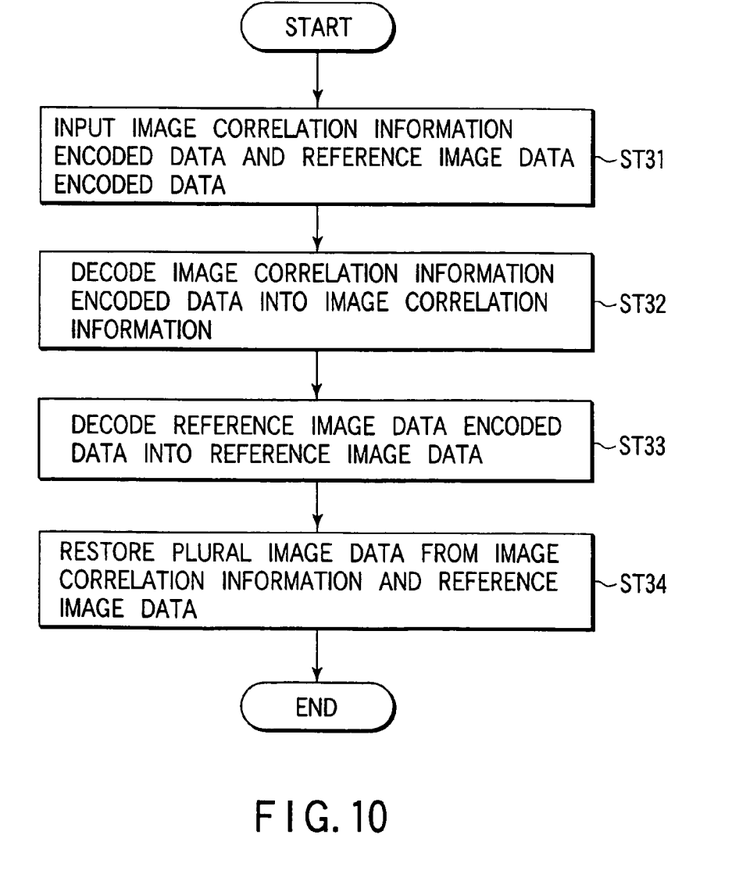
FIG. 10 is a flow chart illustrating an operation of restoring plural image data.

The operation of restoring plural image data in the image processing apparatus 96 of the fourth embodiment will now be described with reference to a flow chart of FIG. 10.

In the image processing apparatus 96, the image correlation information encoded data and reference image data encoded data are delivered from the page memory 98 to the data input means 241 (ST31). The data input means 241 sends the input image correlation information encoded data to the image correlation information decoding means 242 and also sends the input reference image data encoded data to the decoding means 243. The input image correlation information encoded data sent to the image correlation information decoding means 242 is decoded into the image correlation information (ST32). The decoded image correlation information is sent to the image restoring means 244. The reference image data encoded data sent to the decoding means 243 is decoded into the reference image data (ST33). The decoded reference image data is sent to the image restoring means 244.

The image restoring means 244 restores the plural image data from the input image correlation information and reference image data (ST34).

As has been described above, in the fourth embodiment, the reference image data, too, is encoded. Thereby, the amount of communication can be more reduced than in the second embodiment.

Figure 11:
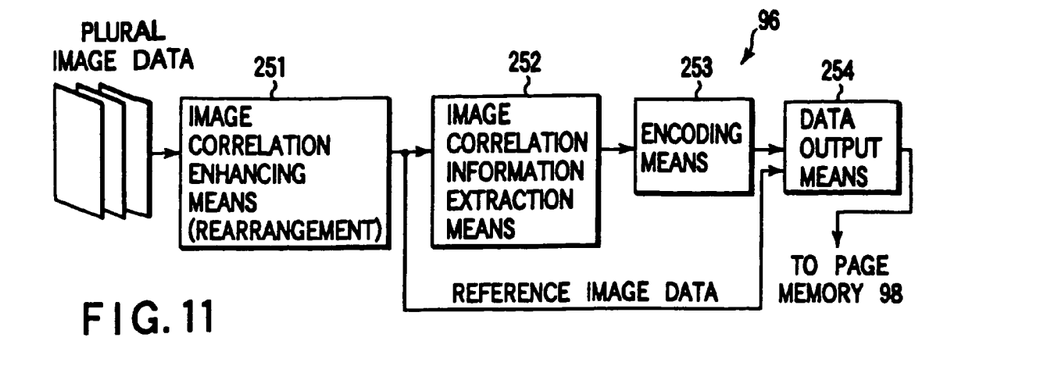
FIG. 11 schematically shows the structure of an image processing apparatus according to a fifth embodiment of the invention.

FIG. 11 schematically shows the structure of the image processing apparatus 96 according to a fifth embodiment of the present invention. In FIG. 11, image correlation enhancing means 251 of the image processing apparatus 96 rearranges a plurality of input image data (digital images) so that a Hamming distance between images may decrease, thereby enhancing the degree of image correlation among the image data. The plural image data rearranged by the image correlation enhancing means 251 are fed to image correlation information extraction means 252. In addition, the first image data of the rearranged plural image data is fed to data output means 254 as reference image data.

The image correlation information extraction means 252 extracts correlation information among image data from the input plural image data, using the first image data as reference image data. The image correlation information extracted by the image correlation information extraction means 252 is sent to encoding means 253. The encoding means 253 compresses the input image correlation information to produce image correlation information encoded data. The image correlation information encoded data compressed by the encoding means 253 is delivered to the data output means 254. The data output means 254 outputs the input image correlation information encoded data and the reference image data.

Figure 12:
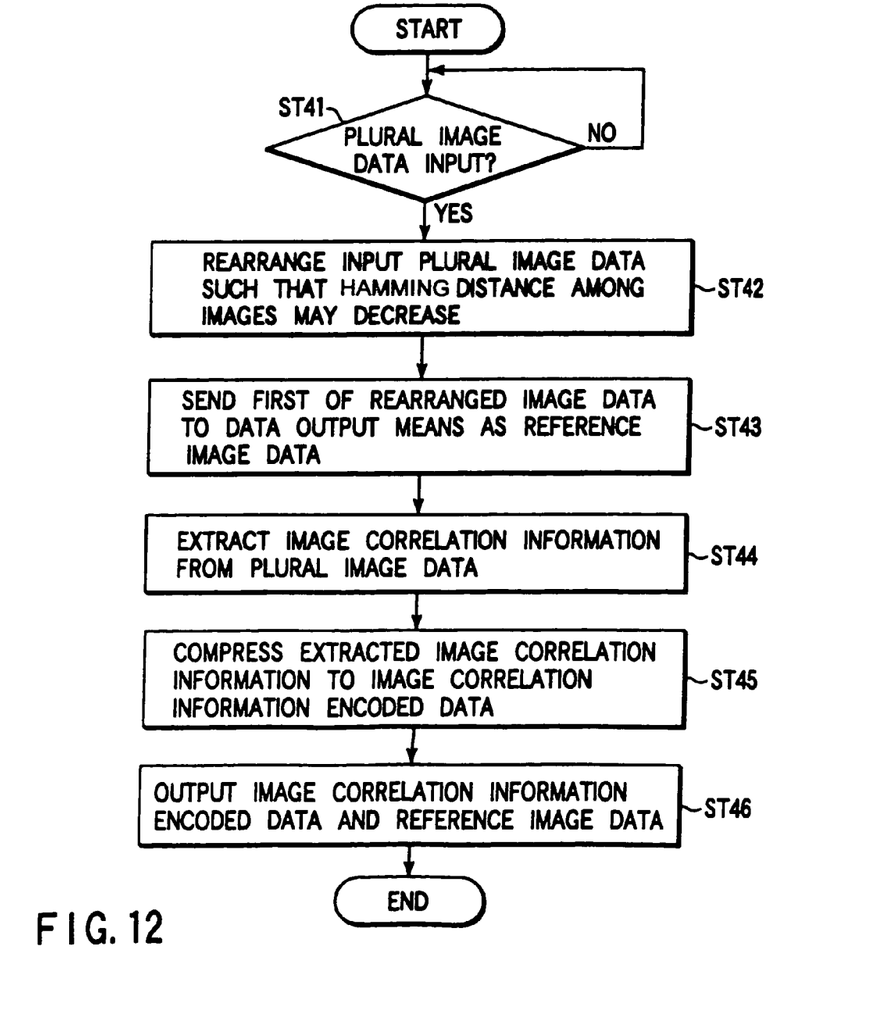
FIG. 12 is a flow chart illustrating an operation of efficiently compressing a plurality of still image data.

The operation of efficiently compressing plural still image data in the image processing apparatus 96 of the fifth embodiment by making use of the correlation of image data will now be described with reference to a flow chart of FIG. 12.

To start with, plural image data read by the scanner section 4 have been input (ST41). Assume that the plural image data are the data of successive original images of the same format, like slips.

In the image processing apparatus 96, the image correlation enhancing means 251 rearranges the input plurality image data so that a Hamming distance between images may decrease (ST42). The resultant image data are sent to the image correlation information extraction means 252. On the other hand, the first image data of the plural image data rearranged by the image correlation enhancing means 251 is sent to the data output means 254 as the reference image data (ST43).

The image correlation enhancing means 251 compares a Hamming distance between preceding image data and subsequent image data in the order of the plural image data rearranged by the image correlation enhancing means 251, with a Hamming distance between preceding image data and image data obtained by parallel-moving subsequent image data. If the latter is smaller, an exclusive OR of pixel values of pixel positions associated with the preceding image and the parallel-moved subsequent image data is calculated in the order of image data. Thereby, image correlation information is extracted (ST44) and it is sent to the encoding means 253. The image correlation information is compressed in the encoding means 253 and converted to image correlation information encoded data (ST45). The image correlation information encoded data is sent to the data output means 254. The data output means 254 outputs the input image correlation information encoded data and reference image data to the page memory 98 (ST46).

As has been described above, in the fifth embodiment, the input plural image data are rearranged by the image correlation enhancing means 251 so that the Hamming distance among the images may decrease. Therefore, the image correlation can be enhanced, compared to the first embodiment.

Figure 13:
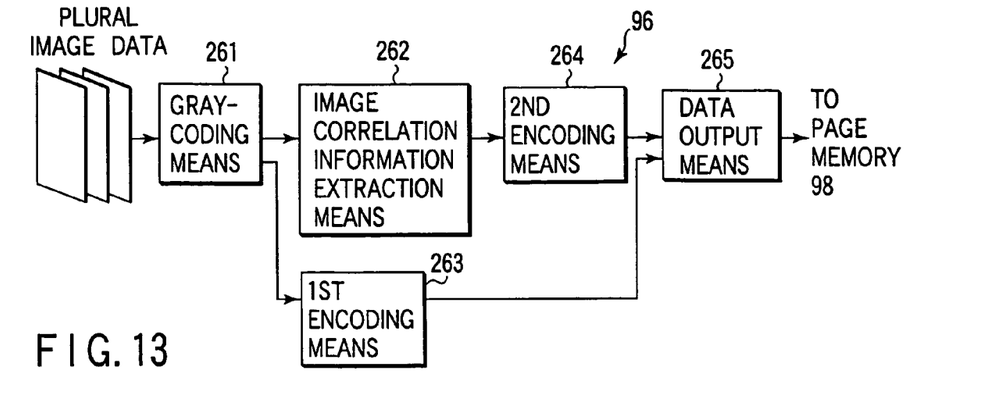
FIG. 13 schematically shows the structure of an image processing apparatus according to a sixth embodiment of the invention.

FIG. 13 schematically shows the structure of the image processing apparatus 96 according to a sixth embodiment of the present invention. In FIG. 13, gray-coding means 261 of the image processing apparatus 96 converts input plural multi-value image data to gray codes. The gray-coded multi-value image data are fed to the image correlation information extraction means 262, with the first multi-value image data used as reference image data. The reference image data is sent to first encoding means 263.

The image correlation information extraction means 262 extracts correlation information on the image data including the reference image data, on the basis of the gray-coded plural multi-value image data, using an Exclusive OR of the same bit. The image correlation information extracted by the image correlation information extraction means 262 is sent to second encoding means 264. The first encoding means 263 compresses the input reference image data and converts it to reference image data encoded data. The reference image data encoded data compressed by the first encoding means 263 is sent to data output means 265. The second encoding means 264 checks a run of zero values of the input image correlation information and converts it to an entropy code, thus producing image correlation information encoded data. The image correlation information encoded data obtained by the second encoding means 264 is delivered to the data output means 265. The data output means 265 outputs the input reference image data encoded data and the image correlation information encoded data to the page memory 98.

The gray-coding in the sixth embodiment will now be described. In the case of a multi-value image, n-bit image data is converted to a gray code. An m-th bit plane is expressed by $P'0\_m$.

The m-th bit plane of this correlation information is given by $$d\_0, 1\_m(i, j) = P'0\_m(i, j) \: EOR \: P'1\_m(i, j)$$

$$\vdots$$

$$\vdots$$

$$\vdots$$

In the case of images with high similarity, "0" values continue for $dl,l+1\_m$. Continuous "0" values frequently occur in image data, $d\_1,l+1$, viewed as n-bit data.

The second encoding means 264 in the sixth embodiment checks a run of "0" values in the first image data $P'0$ and image correlation information (n−1), and converts the run and non-zero values to Huffman codes.

Figure 14:
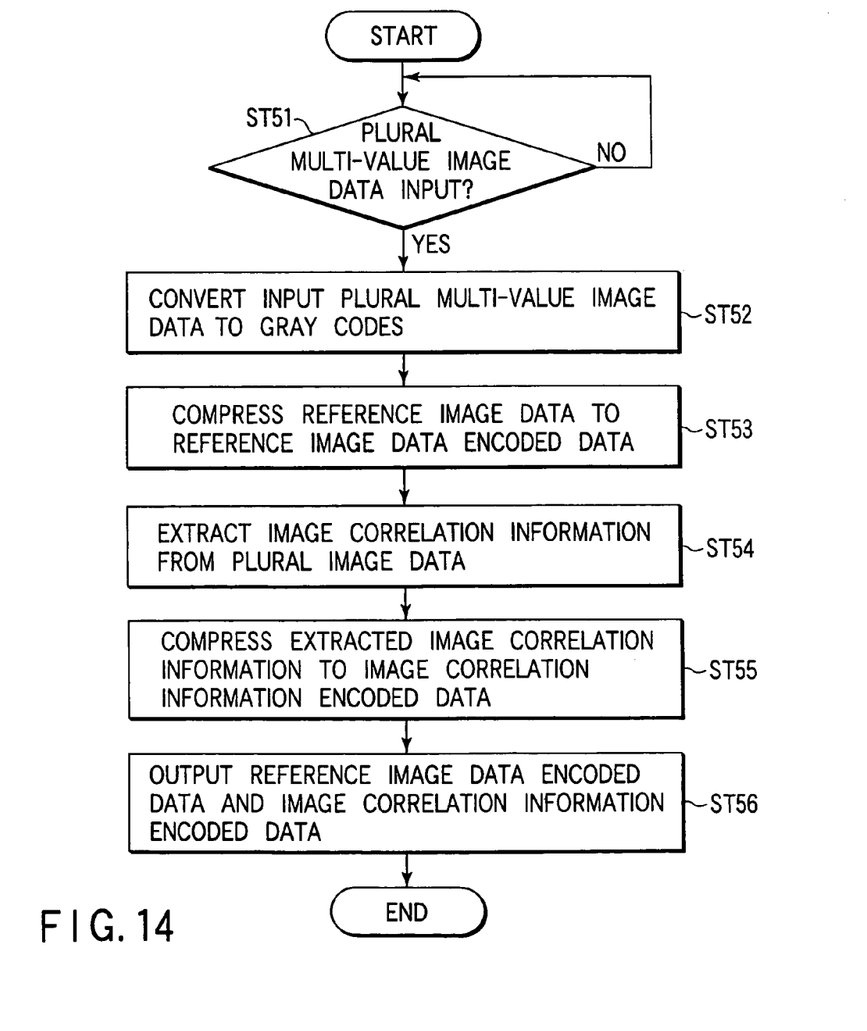
FIG. 14 is a flow chart illustrating an operation of efficiently compressing a plurality of still image data.

The operation of efficiently compressing plural still image data in the image processing apparatus 96 of the sixth embodiment by making use of the correlation of image data will now be described with reference to a flow chart of FIG. 14.

To start with, plural multi-value image data read by the scanner section 4 have been input (ST51). Assume that the plural multi-value image data are the data of successive original images of the same format, like slips.

In the image processing apparatus 96, the input plural multi-value image data are converted to gray codes by the gray-coding means 261 (ST52) and the resultant gray-codes are sent to the image correlation information extraction means 262. The first multi-value image data of the gray-coded multi-value image data is sent to the first encoding means 263 as reference image data. The first encoding means 263 compresses the reference image data to produce reference image data encoded data (ST53). The reference image data encoded data is sent to the data output means 265. The image correlation information extraction means 262 extracts image correlation information from the input plural multi-value image data, using the first multi-value image data as reference image data (ST54). The image correlation information is sent to the second encoding means 264. The second encoding means 264 checks a run of zero values in the image correlation information and converts it to an entropy code, thereby producing image correlation information encoded data (ST55). The image correlation information encoded data is sent to the data output means 265. The data output means 265 outputs the input image correlation information encoded data and reference image data encoded data to the page memory 98 (ST56).

Figure 15:
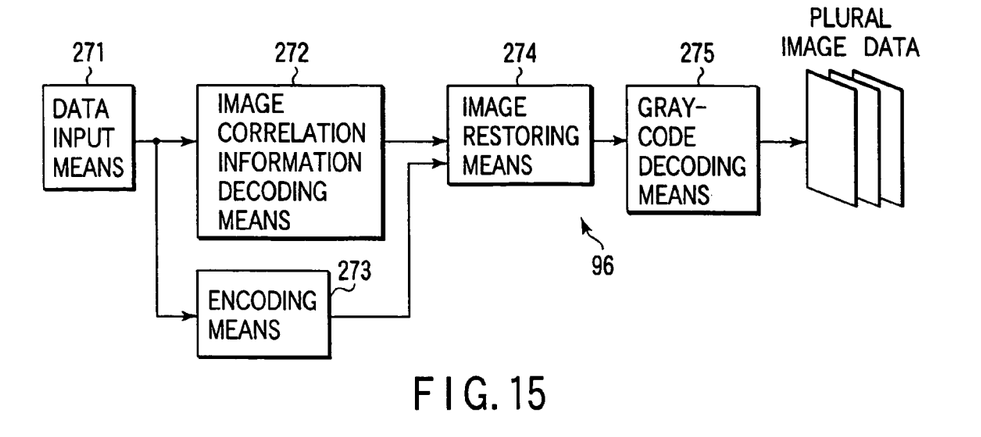
FIG. 15 schematically shows the structure of an image processing apparatus according to a seventh embodiment of the invention.

FIG. 15 schematically shows the structure of the image processing apparatus 96 according to a seventh embodiment of the invention. In the seventh embodiment, the image data gray-coded and compressed in the sixth embodiment is restored, and the gray-code is decoded into the original code.

In FIG. 15, data input means 271 sends the input image correlation information encoded data to image correlation information decoding means 272 and also sends the input reference image data encoded data to decoding means 273. The image correlation information decoding means 272 decodes the image correlation information from the input image correlation information encoded data. The image correlation information decoded by the image correlation information decoding means 272 is sent to image restoring means 274. The decoding means 273 decodes the reference image data from the input reference image data encoded data. The reference image data decoded by the decoding means 273 is sent to the image restoring means 274. The image restoring means 274 restores the plural image data from the input reference image data and image correlation information. The plural image data restored by the image restoring means 274 are sent to gray-code decoding means 275. The gray-code decoding means 275 decodes the gray-codes of the restored plural image data to the original codes.

The conversion of the gray-codes to the original codes in the seventh embodiment will now be described. In this case, the Huffman code is expanded, and P'0 and d_0,1 are obtained from the run and non-zero values. Then, P'1 is obtained from $P1'\_m(i,j) = \text{NOT}(d\_0,1\_m(i,j)) \text{ AND } P'0\_m(i,j)$.

P1 is obtained by converting the gray-codes to the original codes.

This process is repeated for 1 to n.

Figure 16:
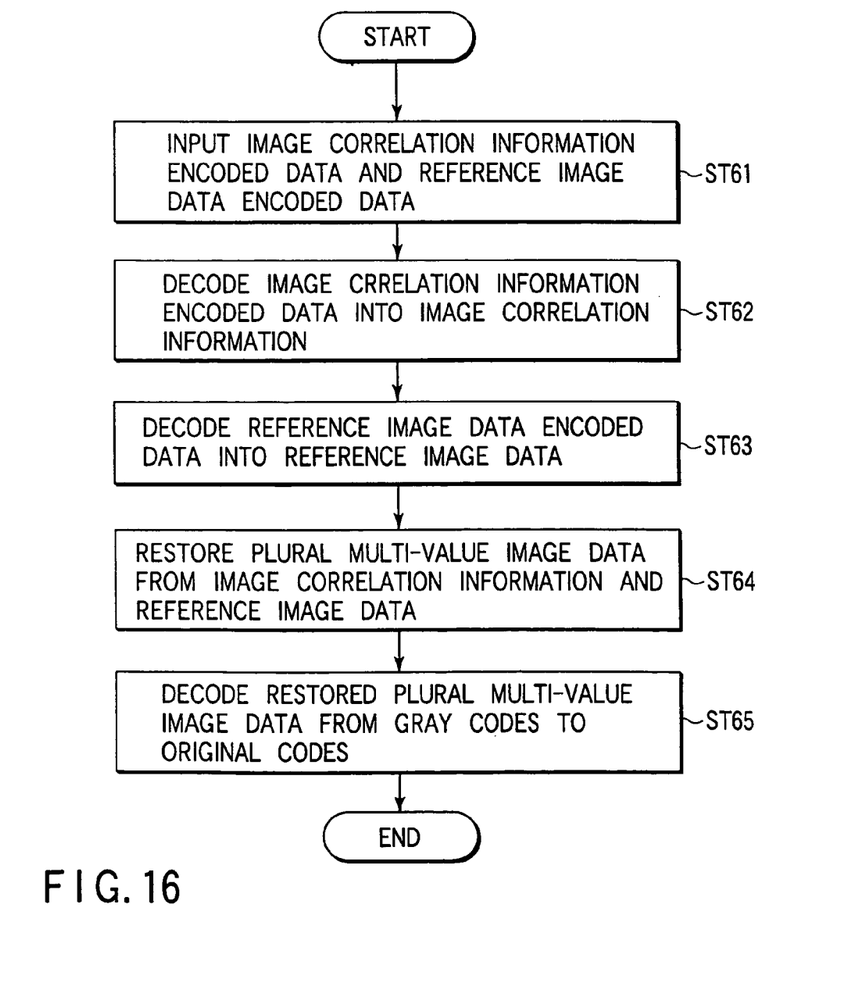
FIG. 16 is a flow chart illustrating an operation of restoring plural image data.

The operation of restoring plural multi-value image data in the image processing apparatus 96 of the seventh embodiment will now be described with reference to a flow chart of FIG. 16.

In the image processing apparatus 96, the image correlation information encoded data and reference image data encoded data are delivered from the page memory 98 to the data input means 271 (ST61). The data input means 271 sends the input image correlation information encoded data to the image correlation information decoding means 272 and also sends the input reference image data encoded data to the decoding means 273. The input image correlation information encoded data sent to the image correlation information decoding means 272 is decoded into the image correlation information (ST62). The decoded image correlation information is sent to the image restoring means 274. The reference image data encoded data sent to the decoding means 273 is decoded into the reference image data (ST63). The decoded reference image data is sent to the image restoring means 274.

The image restoring means 274 restores the plural multi-value image data from the input image correlation information and reference image data (ST64). The restored plural image data are sent to the gray-code decoding means 275.

The gray-code decoding means 275 decodes the gray-codes of the restored plural multi-value image data to the original codes (ST65).

As has been described above, according to the embodiments of the invention, where there are successive original images of the same format, like slips, only different portions of image data are compressed and the compression efficiency is enhanced in an image forming apparatus with a function of successively scanning plural originals.

Moreover, when plural image data are to be printed out, only difference information (image correlation information) between the first image and the other images is sent to the page memory and only a portion of alteration is rewritten on the page memory. Thus, the amount of communication is greatly reduced.

What is claimed is:

1. An image processing apparatus comprising:
    image correlation enhancing unit which enhances an image correlation degree by rearranging a plurality of digital still image data of successive original images of the same format such that a Hamming distance among the images decreases;
    extraction unit which extracts respective image correlation information from the plurality of digital still image data rearranged by the image correlation enhancing unit, by calculating an exclusive OR of pixel values of pixel positions associated with preceding image and subsequent image data in the order of the image data among the successive original images;
    encoding unit which compress the respective image correlation information extracted by the extraction unit to encoded data by run-length encoding; and
    output unit which outputs the encoded data encoded by the run-length encoding by the encoding unit, and first image data of the image data rearranged by the image correlation enhancing unit.

2. The apparatus of claim 1, wherein the extraction unit compares a Hamming distance between preceding image data and subsequent image data in the order of the plurality of digital still image data rearranged by the image correlation enhancing unit, with a Hamming distance between preceding image data and image data obtained by parallel-moving subsequent image data, and if the Hamming distance between the preceding image data and the image data obtained by parallel-moving the subsequent image data is smaller, the extraction unit calculates an exclusive OR of pixel values of pixel positions associated with the preceding image and the parallel-moved subsequent image data in the order of the image data, thereby extracting the respective image correlation information.

3. An image processing apparatus comprising:
    code conversion unit which converts a plurality of input multi-value still image data of successive original images of the same format to gray codes;
    extraction unit which set one of the plural multi-value still image data converted by the code conversion unit to the gray codes as reference image data, and the extracting respective image correlation information of the plurality of input multi-value still image data including the reference image data by using an exclusive OR operation of the same bit;
    first encoding unit which checks a run of zero values in the respective image correlation information extracted by the extraction unit, and converting the image correlation information to entropy codes, thus producing first encoded data;
    second encoding unit which encodes the reference image data to second encoded data; and
    output unit which outputs the second encoded data encoded by the second encoding unit and the first encoded data encoded by the first encoding unit.

4. The apparatus of claim 3, wherein the first encoding unit including a Huffman encoding part.

5. An image processing apparatus comprising:
    inputting part which inputs encoded data formed by encoding respective image correlation information between reference image data and a plurality of still image data;

decoding part which decodes the respective image correlation information from the encoded data input by the inputting part; and image restoring part which restores the plural still image data from the image correlation information decoded by the decoding part and the reference image data input by the inputting part, and restores next image data by a logical operation of image correlation information relating to the reference image data and the next image data in the respective image correlation information and the reference image data, restores image data next and subsequent by a logical operation of image correlation information relating to the restored next image data and the image data next and subsequent and the next image data, and also restores subsequent image data by a logical operation of image correlation information relating to preceding image data and the subsequent image data in the order of image data and the restored preceding image data, thereby restoring the plural still image data.

6. An image processing apparatus comprising:

means for inputting encoded data formed by encoding respective image correlation information between reference image data and a plurality of still image data;

means for decoding the respective image correlation information from the encoded data input by the inputting means; and means for restoring the plural still image data from the image correlation information decoded by the decoding means and the reference image data input by the inputting means, and for restoring means restores next image data by a logical operation of image correlation information relating to the reference image data and the next image data in the respective image correlation information and the reference image data, restores image data next and subsequent by a logical operation of image correlation information relating to the restored next image data and the image data next and subsequent and the next image data, and also restores subsequent image data by a logical operation of image correlation information relating to preceding image data and the subsequent image data in the order of image data and the restored preceding image data, thereby restoring the plural still image data.

\* \* \* \* \*